(12) United States Patent
Shaffer

(10) Patent No.: US 6,532,360 B1
(45) Date of Patent: Mar. 11, 2003

(54) MOBILE SECURITY SYSTEM WITH CELLULAR TRANSCEIVER, POSITION REPORTING AND REMOTE ACTUATION

(76) Inventor: M. Bennett Shaffer, 514 N. Bluff St., St. George, UT (US) 84770

( * ) Notice: Subject to any disclaimer, the term of this patent is extended or adjusted under 35 U.S.C. 154(b) by 0 days.

(21) Appl. No.: 09/460,753

(22) Filed: Dec. 14, 1999

(51) Int. Cl.[7] ............................................. H04M 11/00
(52) U.S. Cl. ........................ 455/404; 455/426; 455/414; 455/456; 340/426
(58) Field of Search .................................. 455/521, 404, 455/426, 345, 414, 456, 422; 342/42, 825; 340/902, 426, 990, 425, 539

(56) References Cited

U.S. PATENT DOCUMENTS

| | | |
|---|---|---|
| 4,100,529 A | 7/1978 | Evans |
| 4,339,753 A | 7/1982 | Mawhinney |
| 4,724,538 A | 2/1988 | Farrell |
| 4,833,477 A | 5/1989 | Tendler |
| 5,055,851 A | 10/1991 | Sheffer |
| 5,081,667 A | 1/1992 | Drori et al. |
| 5,155,689 A | 10/1992 | Wortham |
| 5,185,779 A | 2/1993 | Dop et al. |
| 5,247,564 A | 9/1993 | Zicker |
| 5,334,974 A | 8/1994 | Simms et al. |
| 5,365,570 A | 11/1994 | Boubelik |
| 5,388,147 A | 2/1995 | Grimes |
| 5,418,537 A | 5/1995 | Bird |
| 5,552,789 A | 9/1996 | Schuermann |
| 5,555,286 A | 9/1996 | Tendler |
| 5,572,201 A | 11/1996 | Graham et al. |
| 5,708,417 A * | 1/1998 | Tallman et al. .......... 340/425.5 |
| 5,712,619 A | 1/1998 | Simkin |
| 5,742,666 A | 4/1998 | Alpert |
| 5,786,789 A | 7/1998 | Janky |
| 5,805,055 A * | 9/1998 | Colizza ........................ 340/426 |
| 5,838,237 A | 11/1998 | Revell et al. |
| 5,894,266 A * | 4/1999 | Wood et al. ................. 340/506 |
| 5,918,180 A * | 6/1999 | Dimino ....................... 455/456 |
| 5,926,752 A | 7/1999 | Lin |
| 5,933,074 A | 8/1999 | Settles et al. |
| 5,986,543 A * | 11/1999 | Johnson ....................... 340/426 |
| 6,028,537 A * | 2/2000 | Suman et al. ............... 340/426 |
| 6,067,007 A * | 5/2000 | Gioia .......................... 340/426 |
| 6,133,832 A * | 10/2000 | Winder et al. ............. 340/10.4 |
| 6,167,255 A * | 12/2000 | Kennedy .................... 455/414 |
| 6,262,656 B1 * | 7/2001 | Byrd et al. ................. 307/10.2 |

OTHER PUBLICATIONS

Alpine Electronics, User's Manual, Alpine Mobile Mayday System (On–Guard), ATX Technologies, Inc. (1999).
News Release, Cars: Calling for Help, Automatically, by Ann M. Job, Sep. 13, 1999.

* cited by examiner

*Primary Examiner*—Edward F. Urban
*Assistant Examiner*—Khawar Iqbal
(74) *Attorney, Agent, or Firm*—TraskBritt

(57) ABSTRACT

A mobile security system for use in an automobile or other vehicle, which activates a cellular phone to automatically dial an emergency telephone number and plays a voice recording including position information provided by the vehicle operator. The vehicle operator is prompted to record new position information when the vehicle ignition is turned off. The system can be remotely activated by a wireless transmitter device which generates an RF signal when a "panic button" is depressed. Components of the security system include a cellular telephone, RF receiver device, recording device, and controller. A speaker and microphone permit two-way communication between the vehicle operator and emergency personnel.

14 Claims, 4 Drawing Sheets

MOBILE SECURITY SYSTEM WITH CELLULAR TRANSCEIVER, POSITION REPORTING AND REMOTE ACTUATION

BACKGROUND OF THE INVENTION

1. Field of the Invention

The invention relates generally to the field of personal security systems, the field of vehicle emergency signal and position transmission systems, and to the field of mobile telephone systems for emergency and security use. It relates specifically to systems including cellular telephones capable of automatically dialing a preset emergency telephone number and activating a voice recording for relaying location and identification information.

2. Statement of the Art

Systems for generating and transmitting emergency signals are known in the prior art. These include systems for use on boats and ships, cars or trucks, and systems to be carried on a person. Cellular phone systems for dialing a preset emergency number and transmitting a position signal representing the current position of the vehicle, or, in some cases, the last recorded position of the vehicle are also known in the art. In the prior art, position information is obtained from a GPS or LORAN system, or determined by triangulation (or comparable calculation) from signal strength in cells of a cellular phone system. The prior art includes systems in which GPS or similar coordinates are translated to a local street address for more convenient location of the vehicle or individual. Prior art systems have been activated by various means, including a "panic button", car alarm activation, airbag deployment detector, or by pressing a key or sequence of keys on a telephone keypad.

There remains a need for an alarm system which is inexpensive, provides clear information about vehicle position, and can be activated by a user who is either inside or outside the vehicle.

SUMMARY OF THE INVENTION

The present invention includes a mobile security system for use in an automobile or other vehicle and which, when activated, uses a cellular telephone to dial a pre-set emergency telephone number and play a voice recording which states the location of the vehicle and provides other identifying information. The system also permits direct voice communication between the occupant of the vehicle and the contacted emergency operator. The system can be activated by depressing a switch or button on a user interface box mounted in the vehicle, or by pressing a panic button on a remote activation device which the operator carries on his or her person. The remote activation device transmits an RF signal to a transceiver mounted in the vehicle which then initiates dialing of the cellular telephone and transmission of the recorded emergency message. The remote activation device makes it possible for the user to activate the device from any location in the general vicinity of the vehicle, as well as from inside the vehicle, thereby greatly enhancing the utility of the security system. The system utilizes a voice recording of position information which is recorded by the operator of the vehicle and updated as needed. By using a user-recorded position message, the complexity and cost of the device is considerably reduced in comparison to systems which utilize more costly GPS devices. Moreover, the position message can include details which are not provided by other types of position signals.

The inventive system has the advantage that it can be manufactured relatively inexpensively, since it does not utilize a costly GPS.

The inventive system has the further advantage that it can be activated by a user that is either inside or outside of the vehicle.

It has the further advantage that either a pre-recorded emergency message can be transmitted, or the vehicle user may establish direct two-way communication with an emergency operator.

DETAILED DESCRIPTION OF THE INVENTION

Figure 1:
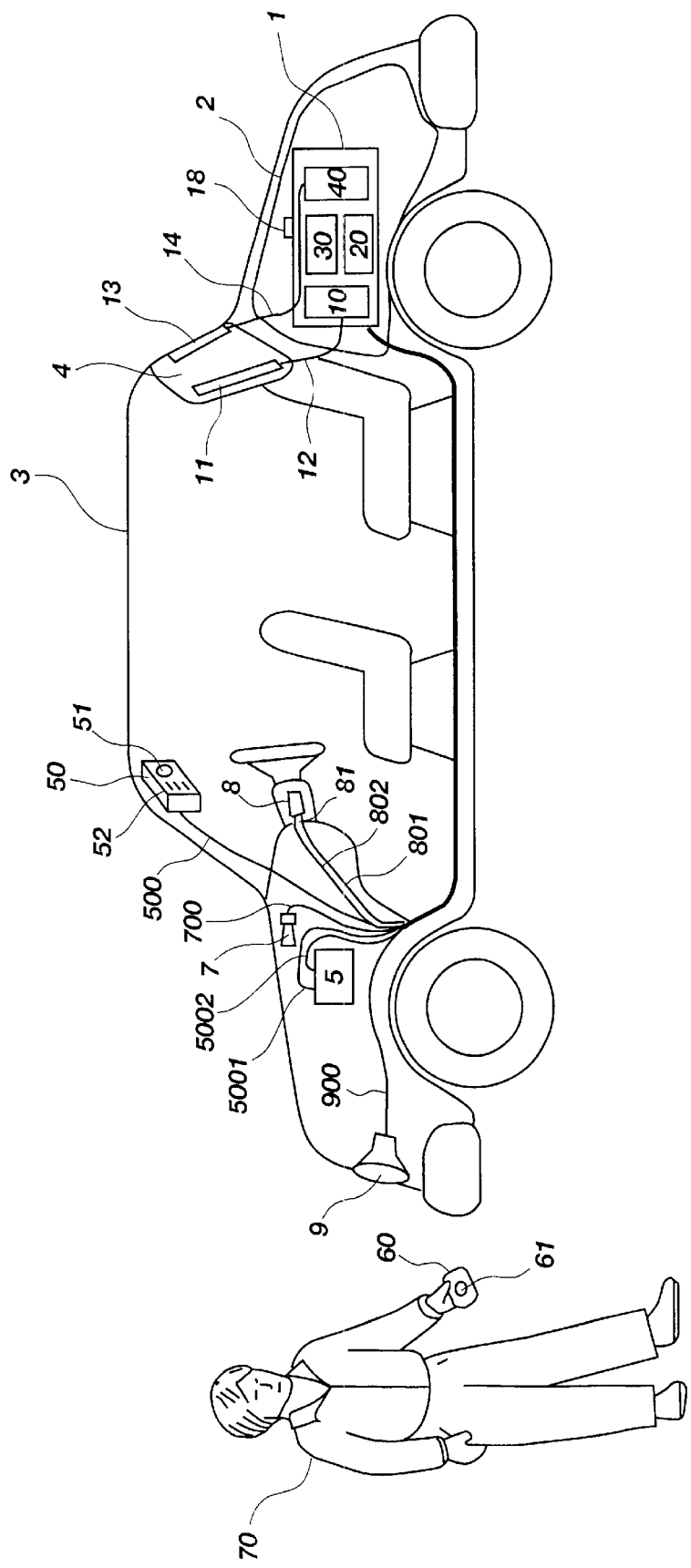
FIG. 1 depicts the components of the invention.

An example of a presently preferred embodiment of the invention is shown in FIG. 1. The main components of the invention are located in alarm box 1, which is preferably installed in a hidden location, for example the trunk 2 of vehicle 3, as shown here. The main components of the device include cellular telephone 10, controller 20, recording device 30, and radio frequency (RF) receiver device 40. Cellular telephone 10 is connected to antenna 11 via cable 12; RF receiver device 40 is connected to antenna 13 via cable 14. Antennas 11 and 13 are preferably mounted in the rear window 4 of vehicle 3, but alternatively may be mounted in any other location which provides acceptable signal reception.

A message providing identifying information (e.g., user name, vehicle license plate number, etc.) and location information can be recorded with recording device 30. In the event of an emergency, the user activates the device either by pressing a button 51 on user interface 50 which is mounted inside vehicle 3, or by pressing a button 61 on remote activation device 60 which the vehicle user 70 carries on his or her person. Remote activation device 60 sends an RF signal to receiver device 40, which signals controller 20. Controller 20 activates cellular telephone 10 to dial a pre-programmed emergency telephone number and activates recording device 30 to play the pre-recorded emergency message which includes identification and location information. The controller may also be programmed to activate the vehicle horn 7 or lights 9, respectively, via lines 700 or 900, or disable the vehicle upon receipt of a signal from the remote activation device 60. If button 51 on interface 50 is depressed, a signal is sent to controller 20, which causes it to activate cellular telephone 10 to dial the pre-programmed emergency telephone number; however, instead of activating recording device 30 to playing a pre-recorded message, two-way communication between the user and emergency operator is enabled. The system can be reset and transmission halted by pressing reset switch 18, which is mounted on alarm box 1. Reset switch 18 is covered, recessed, or otherwise protected to prevent it from being depressed accidentally. Alternatively, the system may be reset using a reset button located on the remote activation device 60, on user interface 50, or elsewhere in the system.

Alarm box 1 may be constructed of metal or other durable material, and is sized to contain cellular telephone 10, controller 20, RF receiver device 40, and recording device 30. All components residing within alarm box 1 are preferably powered by the 12 Volt DC vehicle battery 5, which is connected to alarm box 1 by cables 5001 and 5002. Alternatively, it would be possible to provide a separate power supply (e.g., battery) for the components of the invention. Remote activation device 60 is packaged separately and is preferably powered by a battery.

Figure 2:
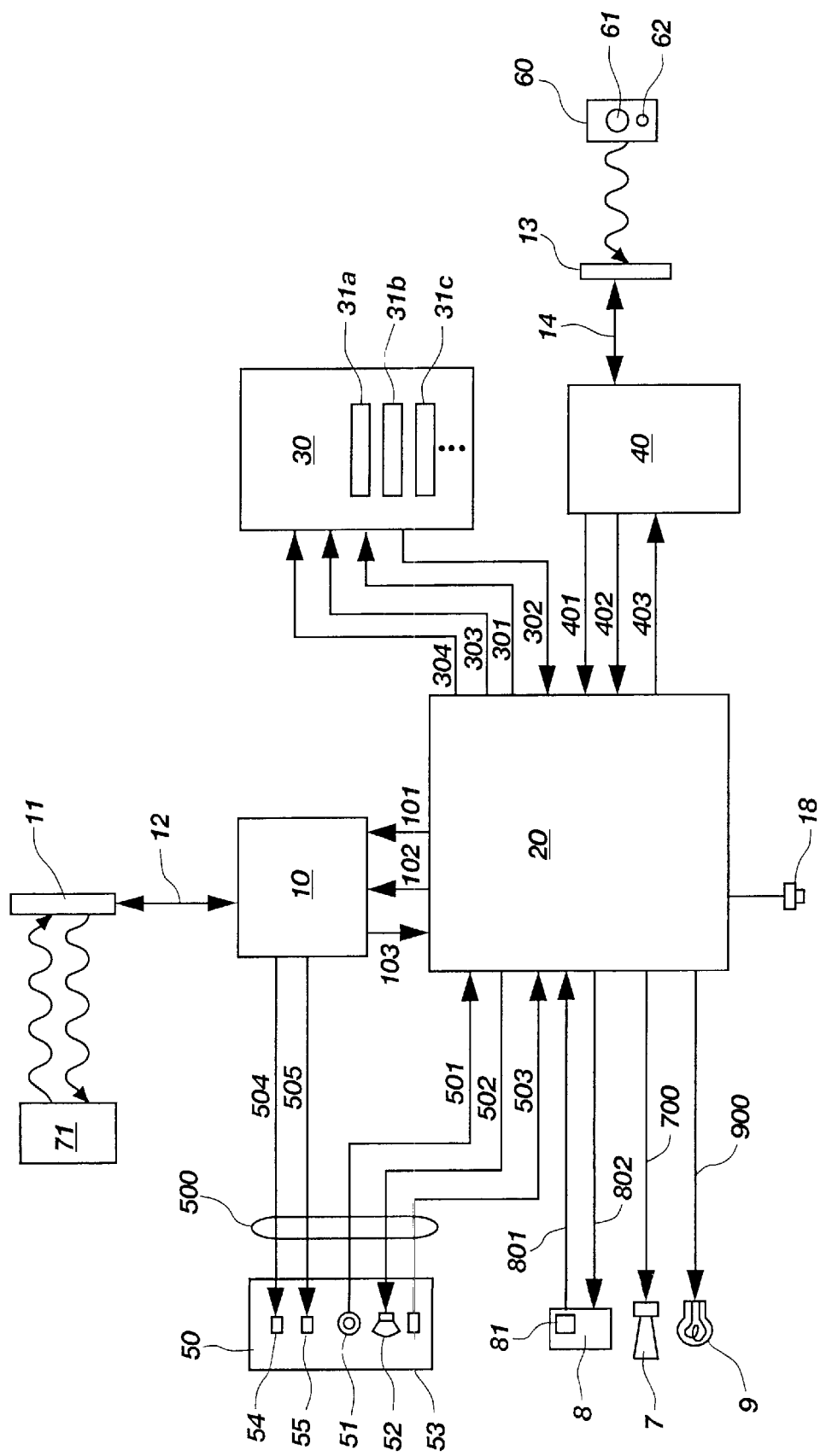
FIG. 2 is a schematic diagram of the invention.

A schematic diagram of the components of the inventive system is given in FIG. 2.

Cellular telephone 10 is a conventional cellular telephone which has been modified so that its voice output signal is sent out on line 103, so that it may be routed to speaker 52 in user interface 50 via line 502. Cellular telephone 10 accepts as input 101 either the output signal 304 from recording device 30 or the audio signal on line 503 from microphone 53 in user interface 50. In an alternative embodiment of the invention, audio input 101 may originate from microphone 62 in remote activation device 60. The audio signal would be sent from receiver device 40 to controller 20 via line 402, and from there to cellular telephone 10. Cellular telephone 10 is pre-programmed with a desired emergency number (e.g., 911, a private security company, police, or other emergency service provider) in the usual manner; however, telephone 10 is modified so that auto-dialing is initiated upon receipt of an activation signal on line 102. The audio input received on line 101 is converted to a cellular telephone signal which is sent to antenna 11 via line 12 and transmitted to cellular telephone transceiver device 70 and routed to the emergency service provider. Cellular voice signals from the contacted emergency service are picked up by antenna 11, carried to cellular telephone 10 on line 12, and output from cellular telephone 10 on line 103. If the cellular phone 10 is not receiving a strong enough signal to transmit, it generates a signal on line 504 which causes weak signal indicator light 54 in interface box 50 to be illuminated. If cellular phone 10 is receiving a strong enough signal for transmission, it generates a signal on line 505 which causes ready signal indicator light 55 in interface box 50 to be illuminated.

RF receiver device 40 is a radio frequency (RF) receiver. RF receiver device 40 is connected to antenna 13 via cable 14. RF receiver device 40 is tuned to receive RF signals which are generated by remote activation device 60. RF signals transmitted by remote activation device 60 include an alarm signal which is generated when a "panic button" 61 is pressed, and, optionally, an audio signal picked up by a microphone 62 in remote activation device 60. RF receiver device 40 sends a notification signal on line 401 to controller 20 when the alarm signal is received from remote activation device 60. The audio signal originating from microphone 62 is transmitted to controller 20 on line 402, and from there is routed to cellular phone 10 on audio input line 101. RF receiver device 40 receives a reset signal from controller 20 on line 403. The reset signal causes the receiver device to stop sending to controller 20 and commence waiting for an alarm signal from remote activation device 60. In some embodiments of the invention it may be desirable to use a device capable of both receiving and transmitting signals (i.e., a transceiver) in place of receiver device 40, for example, if it were desired to transmit signals back to remote activation device 40 to permit two-way communication.

Recording device 30 is used to record, store and replay a number of voice messages used by the inventive system. These include a prompt message which instructs the user to record a position message indicating the current (or most recent) location of the vehicle, the location description recorded by the user, a message containing identifying information pertaining to the vehicle or driver (e.g. vehicle make and/or model, license plate number, driver name and/or driver's license number, etc.), and other messages which may be used in the practice of the invention. Recording device 30 preferably includes a plurality of memory or recording locations 31a, 31b, 31c, etc. where the various messages can be stored and from which the messages can be retrieved. Recording device 30 further includes audio input 301, audio output 302, memory select input 303, and function select input 304. These are preferably digital inputs and outputs, which may be either parallel or serial. Audio input 301 and output 302 must have sufficient throughput to transmit a signal of acceptable quality in a reasonable amount of time. Memory select input 303 accepts an input signal which represents the memory location in which the desired message is to be stored, or from which it is to be retrieved. Function select input accepts an input signal which indicates the function to be performed by recording device 30, i.e. whether it is to record the signal on audio input 301 in the selected memory location or play the message in the selected memory location on audio output 302. It will be appreciated by those of ordinary skill in the art that various recording devices having various combinations of inputs and outputs may be suitable for use in the invention, and that the invention is not limited to the particular configuration described here.

When a sensor 81 on the ignition 8 of vehicle 3 detects that ignition 8 has been shut off, a signal is generated on line 801. On detection of this signal, controller 20 generates signals memory select line 303 and function select line 304 causing recording device 30 to play a prompt message stored in memory location 31a on audio output 302. The prompt message, which is routed to speaker 52 on line 502, instructs the vehicle user to record a new location description. Though less preferred, it would also be possible to generate a beep or other sound to indicate to the user that a new location description should be recorded. A signal on function select line 304 enables recording device 30; the user speaks into microphone 53, and the signal from microphone 53 is carried to controller 20 via line 503, routed to recording device 30 on audio input line 301, and recorded in memory location 31b. In alternative embodiments of the invention, the voice signal to be recorded could originate from microphone 62 in remote activation device 60, or another source.

In the preferred embodiment of the invention, recording device 30 also stores a recording of identification information (driver name, vehicle license plate number, etc.), e.g., in memory location 31c. The identification information is preferably recorded at the time that the inventive system is installed in the vehicle, and updated only as needed; it would not be necessary, and indeed would probably be inconvenient and time-consuming, to record identification information each time the location information was recorded.

Recording device 30 may also store a greeting or introductory message, e.g. in memory location 31d, which would be played at the start of an emergency call. In the event that an emergency occurs and the inventive system is activated, controller 20 would send an activation signal to recording device 30 causing it to play back, in a predetermined sequence, the greeting, location, and identifying information stored in memory locations 31d, 31c, and 31b. The activation signal could consist of a sequence of signals on memory select input 303, specifying the memory locations of the message components, accompanied by a "play" signal on function select input 304, instructing the recording device to play back the messages in the indicated memory locations. The messages would be played on output line 302 and routed to cellular telephone 10 via line 101 by controller 20 following dialing of the emergency number. It will be appreciated that various message components may be combined, and the practice of the invention is not limited to recording and combining three message components from three memory locations, as described here. Moreover, it may be desirable to use a larger number of prompts in the system, e.g., to prompt the user to record the identification information, to provide instructions on system use, etc., and these also may be stored in and retrieved from recording device 30. The use of recording device 30 for recording location information eliminates the need for using a costly GPS or similar system. Moreover, the user may record details on location not available in global coordinates or even street addresses (e.g. "at the back of the building", "on the third level of the parking garage", or "in the northbound lane of the highway") which may significantly aid emergency personnel in locating the vehicle or driver.

Figure 3:
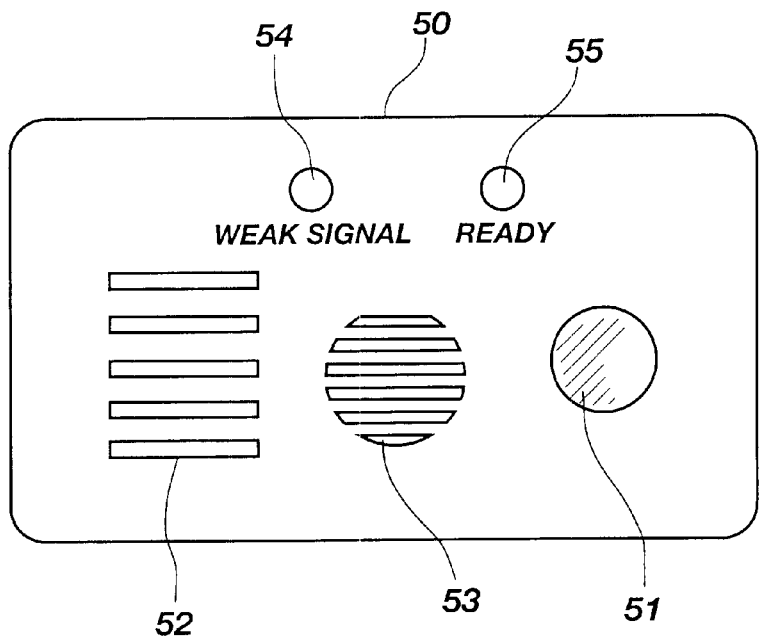
FIG. 3 is a front view of the user interface box.
Figure 4:
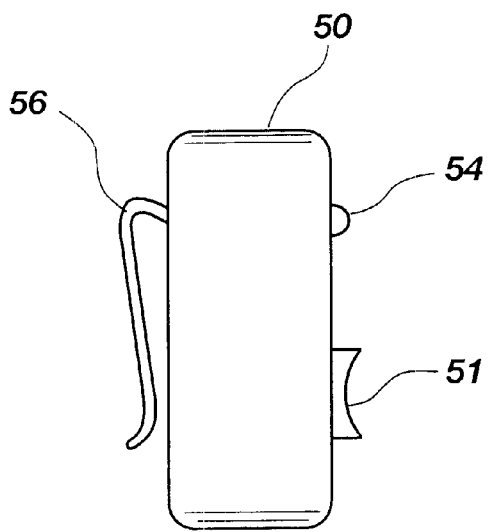
FIG. 4 is a side view of the user interface box.

User interface 50 is preferably mounted in the front portion of the passenger compartment of vehicle 3, e.g. above the rear view mirror, as shown in FIG. 1. Interface box 50 is illustrated in more detail in FIGS. 3 and 4. It includes a speaker 52 and microphone 53 which are used in providing voice prompting by the system and recording of messages by the user, as described previously in connection with the recording device. Speaker 52 and microphone 53 may be of the type used in cellular phones. User interface box 50 also includes a switch 51 which is preferably a button (a "panic button"). If switch 51 is activated (i.e. pressed, in the case that it is a button) controller 20 activates cellular phone 10 to dial the pre-programmed emergency number. The audio signal from microphone 53 is carried to controller 20 on line 503, and from there routed to cellular phone 10 on line 101, to be transmitted to the cellular telephone transceiver device 71 for routing to the emergency service provider. The signal from the emergency service is sent to controller 20 on line 103, and from there routed to speaker 52. This allows direct two-way communication between the occupant of the vehicle and the contacted emergency personnel.

Weak signal indicator light 54 and ready signal indicator light 55 are mounted on the outside of box 50. Weak signal indicator light 54 is preferably a red light emitting diode (LED) and ready signal indicator light 55 is preferably a green LED. However, it will be appreciated that other colors and types of lights may be used in the practice of the invention. A cable 500 containing lines 501, 502, 503, 504 and 505 from switch 51, speaker 52, microphone 53, weak signal indicator light 54 and ready signal indicator light 55, respectively, runs from interface box 50 to alarm box 1, as shown in FIG. 1. Interface box 50 may be constructed of plastic. A metal clip 56 on the rear of box 50 may be used to mount interface box 50 to the plastic strip 6 found between the windshield and "headliner" of vehicle 3. Alternatively, interface box 50 may be mounted to the windshield, rear view mirror, sun visor, or location in the vicinity of the driver, with the use of clamps, suction cups, adhesive, etc., as known in the art.

Figure 5:
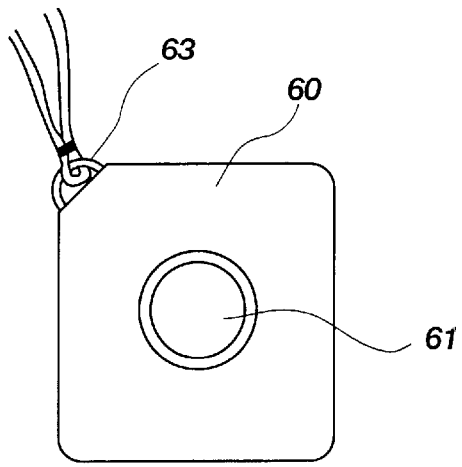
FIG. 5 is a front view of one embodiment of the remove activation device.
Figure 6:
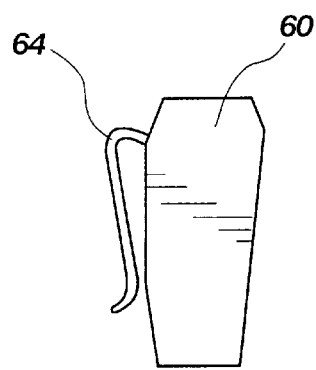
FIG. 6 is a side view of the remote activation device of FIG. 5.
Figure 7:
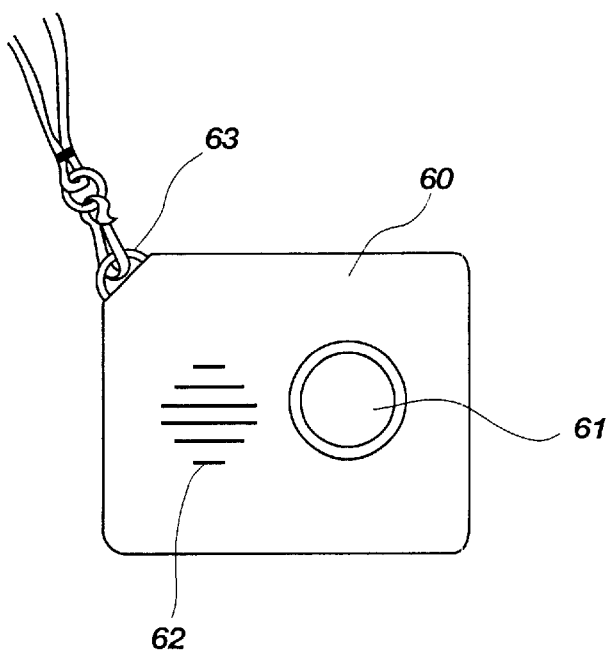
FIG. 7 shows an alternative embodiment of the remote activator device.

Remote activation device 60 may be carried on the vehicle user's person, and is used to provide remote activation of the system. Remote activation device 60 is preferably designed to be small enough to carry easily and to have an inconspicuous appearance. For example, it may be made to resemble a pager, as depicted in FIGS. 5, 6 and 7. Remote activation device 60 preferably includes means for attaching it to the user's clothing, such as clip 64, or loop 63 or similar means which permit it to be attached to a key chain or necklace. A first example of remote activation device 60 is depicted in FIGS. 5 and 6. This embodiment of the device includes activation switch (button) 61, which causes activation of remote activation device 60 to transmit an RF alarm signal which is picked up by RF antenna 13 and received by RF receiver device 40. Receiver device 40 sends an activation signal to controller 20 via line 401, causing controller 20 to activate cellular telephone 10 to dial the pre-programmed emergency message and activate recording device 30 to play the prerecorded message composed of greeting, location, and identification components, which is then transmitted to the emergency operator by cellular telephone 10, as described previously. Optionally, the controller 20 can be configured to cause the vehicle horn 7 to honk or to disable the vehicle ignition 8 if an alarm signal is received from remote activation device 60.

An alternative embodiment of remote activation device 60 is shown in FIG. 7. This embodiment of the device includes all the features included in the embodiment of the invention shown in FIGS. 5 and 6, and also includes a microphone 62 for picking up an audio signal which is transmitted to RF receiver device 40, sent to controller 20 on line 402, and routed to cellular telephone 10 for transmission to the emergency operator. This allows the user to provide a verbal message in addition to the pre-recorded location and identification messages, and also allows the emergency operator to listen to any activity (sounds of distress, etc.) taking place in the vicinity of remote activation device 60. A further alternative would be to include a receiver and a speaker in remote activation device 60, to allow two-way communication between the user and the emergency operator; however, inclusion of additional components would lead to an increase in the size and weight of the device.

It is anticipated that user interface box 50 would be used to activate the system in cases where the vehicle user could readily reach and press button 51, and in which two-way communication was desired, for example, if the vehicle had an engine breakdown or flat tire, or if the vehicle user noted suspicious activity outside the vehicle. Remote activation device 60 would be used in cases where the vehicle user was outside the vehicle, or was inside the vehicle but unable to reach the user interface (e.g., if the person was injured by an accident) or needed to contact emergency personnel without attracting attention (e.g., if an intruder was in the vehicle).

Controller 20 includes switching, timing, and control logic. As will be appreciated from the foregoing descriptions of the various components of the invention, controller 20 controls the routing of input and output signals between other components of the invention. Controller 20 also must generate appropriate delays between actions carried out by other components of the invention, for example, between generation of a prompt to record position information and actual recording of the information, or between automatic dialing of the pre-programmed emergency number and playing and transmission of the recorded message containing identification and location information. Controller 20 may include analog and digital circuitry, programmable memory devices, a microprocessor, and other components as known to those of ordinary skill in the art. Controller 20 may be connected to switches which allow the user to select various options, such as whether controller 20 should cause the vehicle horn 7 to honk or disable the vehicle ignition 8 if an alarm signal is received from remote activation device 60. It will be appreciated that various methods of constructing controller 20 may be devised by those of ordinary skill in the art, and the practice of the invention is not limited to a particular embodiment thereof.

While the present invention has been described and illustrated in terms of certain specific embodiments, those of ordinary skill in the art will understand and appreciate that it is not so limited. Additions to, deletions from and modifications to these specific embodiments may be effected without departing from the scope of the invention as defined by the claims. Furthermore, features and elements from one specific embodiment may be likewise applied to another embodiment without departing from the scope of the invention as defined herein.

What is claimed is:

1. A mobile security system for use in a vehicle comprising:
    a cellular telephone configured for receiving a first activation signal and, upon receipt of said first activation signal, dialing a preprogrammed emergency telephone number of an emergency service provider and transmitting an emergency message to said emergency service provider;
    a user interface device comprising a microphone and a speaker;
    a recording device configured for recording, storing, and playing back a plurality of messages, said emergency message comprised of at least one of said plurality of messages, said recording device configured for receiving a second activation signal and, upon receipt of said second activation signal, sending said emergency message to said cellular telephone;
    a remote activation device comprising a transmitter and a user input device, said remote activation device configured for transmitting an arm signal upon recent of an input on said user input device;
    a receiver device tuned to receive said alarm signal transmitted by said remote activation device, and configured for generating a notification signal upon receipt of said alarm signal; and
    a controller configured for receiving said notification signal from said receiver device and, upon receipt of said notification signal, generating said first activation signal for sending to said cellular telephone to initiate dialing of said preprogrammed emergency telephone number and generating said second activation signal for sending to said recording device to initiate sending of said emergency message to said cellular telephone from said recording device;
    wherein said user interface device, said receiver device, and said controller are configured for placement within said vehicle, and wherein said remote activation device is configured for generating an alarm signal for reception by said receiver device when said remote activation device is located at a distance from said receiver device.

2. The mobile security system of claim 1, wherein said emergency message comprises a location description.

3. The mobile security system of claim 1, wherein the vehicle comprises a horn, and wherein upon receipt of said notification signal, said controller causes said horn to honk at least once.

4. The mobile security system of claim 1, wherein the vehicle comprises headlights and tail lights, and wherein upon receipt of said notification signal, said controller causes one or more of said headlights and said tail lights to be illuminated.

5. The mobile security system of claim 1, wherein said remote activation device further comprises a microphone capable of picking up and audio signal transmitting said audio signal from said remote activation device to said receiver device and routing said audio signal to said cellular telephone by said controller.

6. The mobile security system of claim 5, wherein said user interface device further comprises a switch capable of activation by a user, and wherein activation of said switch by said user causes transmission of a third activation signal to said cellular telephone causing dialing of said preprogrammed emergency telephone number, and wherein activation of said switch further causes routing of an audio signal from said microphone in said user interface device to said cellular telephone for transmission and routing of the audio signal received by said cellular telephone from said emergency service provider to the speaker of said user interface device.

7. The mobile security system of claim 6, wherein said emergency message comprises a recording of location information.

8. The mobile security system of claim 1, wherein said user interface device further comprises a microphone capable of picking up an audio signal, and wherein said audio signal may be routed from said user interface device to said cellular telephone by said controller.

9. The mobile security system of claim 8, wherein said emergency message comprises a location description.

10. The mobile security system of claim 8, wherein said user interface device further comprises a switch capable of activation by a user, and wherein activation of said switch by said user causes transmission of a third activation signal to said cellular telephone causing dialing of said preprogrammed emergency telephone number, and wherein activation of said switch further causes routing of an audio signal from said microphone to said cellular telephone for transmission and routing of the audio signal received by said cellular telephone to the speaker of said user interface device.

11. The mobile security system of claim 1, wherein at least one of said plurality of messages stored by said recording device is a prompt message, wherein said prompt message is configured for playing through a speaker to instruct a user to state a location description, and wherein said location description is recorded by said recording device.

12. The mobile security system of claim 11, wherein said emergency message comprises a location description.

13. The mobile security system of claim 11, wherein said vehicle comprises an ignition switch and a detector associated with said ignition switch for detecting shutoff of said ignition switch, and wherein said prompt message is played and said recording device is enabled to record said location description upon detection of shutoff of said ignition switch.

14. A mobile security system for use in a vehicle, said mobile security system comprising:
    a cellular telephone configured for receiving a first activation signal and, upon receipt of said first activation signal, dialing a preprogrammed emergency telephone number of an emergency service provider and transmitting an emergency message to said emergency service provider;
    a user interface device comprising a microphone, a speaker, and a user-activated switch;
    a recording device capable of recording, storing, and playing back a plurality of messages, said emergency message comprised of at least one of said plurality of messages, said recording device configured for receiving a second activation signal and, upon receipt of said second activation signal, sending said emergency message to said cellular telephone;

a remote activation device comprising a transmitter and a user-activated switch, said remote activation device capable of transmitting a RF alarm signal upon activation of said user-activated switch of said remote activation device;

a receiver device connected to an antenna, tuned to receive said RF alarm signal transmitted by said remote activation device and configured for generating a notification signal upon receipt of said RF alarm signal; and a controller configured for receiving said notification signal from said receiver device and, upon receipt of said notification signal, generating said first activation signal for sending to said cellular telephone to initiated dialing of said preprogrammed emergency telephone number and generating said second activation signal for sending to said recording device to initiate sending of said emergency message to said cellular telephone from said recording device;

wherein said user interface device, said receiver device and said controller are configured for placement within said vehicle, wherein said remote activation device is configured for generating an alarm signal for receiving by said receiver device when said remote activation device is located at a distance from said receiver device, wherein said plurality of messages stored by said recording device includes at least one prompt message instructing a vehicle user to state position information, and at least two emergency message components for combining to form said emergency message, at least one of said at least two emergency message components comprising a location description.

* * * * *

UNITED STATES PATENT AND TRADEMARK OFFICE
CERTIFICATE OF CORRECTION

PATENT NO. : 6,532,360 B1  Page 1 of 2
APPLICATION NO. : 09/460753
DATED : March 11, 2003
INVENTOR(S) : M. Bennett Shaffer It is certified that error appears in the above-identified patent and that said Letters Patent is hereby corrected as shown below:

In the specification:

| | | |
|---|---|---|
| COLUMN 2, | LINE 14, | change "interface box." to --interface.-- |
| COLUMN 2, | LINE 15, | change "interface box." to --interface.-- |
| COLUMN 2, | LINE 16, | change "of the remove" to --of the remote-- |
| COLUMN 2, | LINE 33, | change "via cable" to --via cable or line-- |
| COLUMN 2, | LINE 47, | change "signal to receiver" to --signal to RF receiver-- |
| COLUMN 3, | LINE 17, | change "signal 304" to --signal 302-- |
| COLUMN 3, | LINE 22, | change "sent from receiver" to --sent from RF receiver-- |
| COLUMN 3, | LINE 27, | change "however, telephone" to --however, cellular telephone-- |
| COLUMN 3, | LINE 32, | change "device 70" to --device 71-- |
| COLUMN 3, | LINE 38, | change "in interface" to --in user interface-- |
| COLUMN 3, | LINE 39, | change "box 50 to" to --50 to-- |
| COLUMN 3, | LINE 42, | change "interface box 50" to --user interface 50-- |
| COLUMN 3, | LINE 62, | change "place of receiver" to --place of RF receiver-- |
| COLUMN 4, | LINE 12, | change "select input 303," to --select line 303,-- |
| COLUMN 4, | LINE 13, | change "select input 304." to --select line 304.-- |
| COLUMN 4, | LINE 17, | change "select input 303" to --select line 303-- |
| COLUMN 4, | LINE 20, | change "select input accepts" to --select line 304 accepts-- |
| COLUMN 4, | LINE 33, | change "signals memory" to --signals on memory-- |
| COLUMN 4, | LINE 58, | change "31*d*, which" to --31*d* (not shown), which-- |
| COLUMN 5, | LINE 24, | change "Interface box" to --User interface-- |
| COLUMN 5, | LINE 30, | change "interface box 50" to --interface 50-- |
| COLUMN 5, | LINE 44, | change "of box 50." to --of user interface 50.-- |
| COLUMN 5, | LINE 52, | change "interface box 50" to --user interface 50-- |
| COLUMN 5, | LINE 53, | change "Interface box 50" to --User interface 50-- |
| COLUMN 5, | LINE 54, | change "box 50" to --user interface 50-- |
| COLUMN 5, | LINE 55, | change "interface box 50" to --user interface 50-- and change "strip 6 found" to --strip 6 (not shown) found-- |

UNITED STATES PATENT AND TRADEMARK OFFICE
CERTIFICATE OF CORRECTION

| | | |
|---|---|---|
| PATENT NO. | : 6,532,360 B1 | |
| APPLICATION NO. | : 09/460753 | |
| DATED | : March 11, 2003 | |
| INVENTOR(S) | : M. Bennett Shaffer | |

It is certified that error appears in the above-identified patent and that said Letters Patent is hereby corrected as shown below:

In the specification (continued):

COLUMN 5,    LINE 57,      change "interface box 50" to --user interface 50--

COLUMN 6,    LINE 36,      change "interface box 50" to --user interface 50--

Signed and Sealed this

Second Day of October, 2007

JON W. DUDAS
*Director of the United States Patent and Trademark Office*